April 20, 1954 K. W. COOK 2,676,028
ADJUSTABLE IDLER STEERING ARM BEARING
Filed June 6, 1950 2 Sheets-Sheet 2
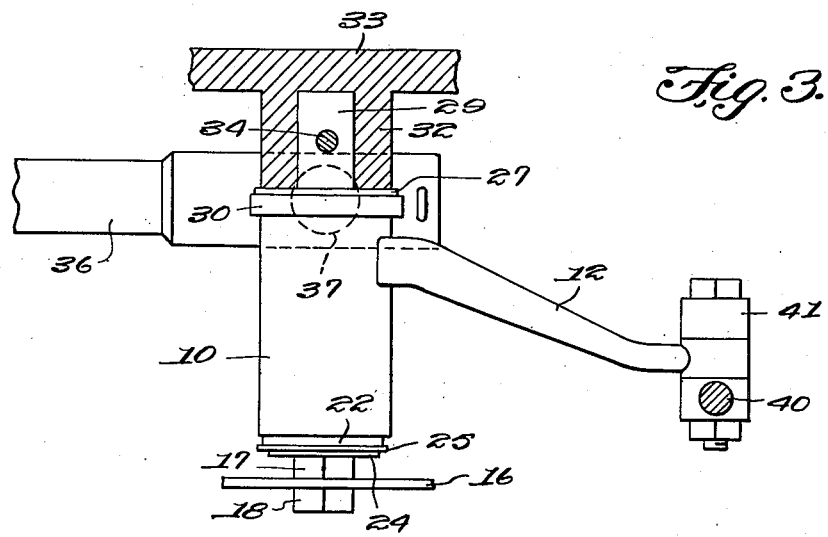
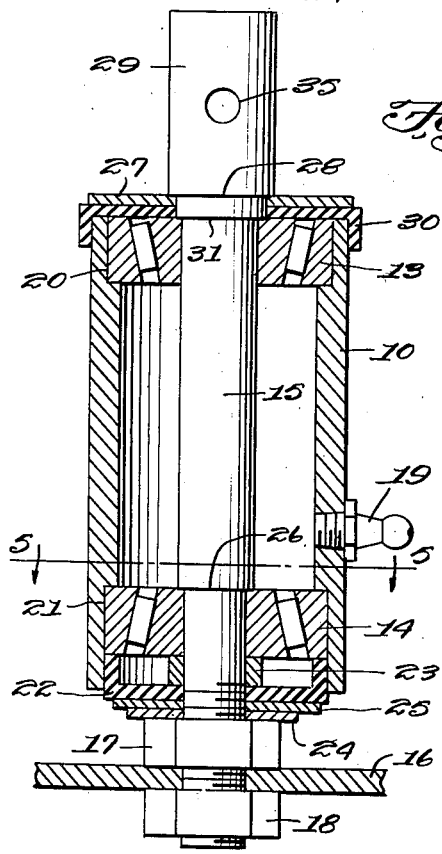
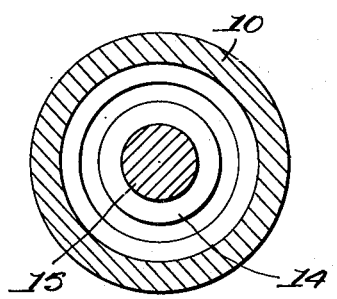
INVENTOR.
Keith W. Cook,
BY Victor J. Evans & Co.
ATTORNEYS Patented Apr. 20, 1954

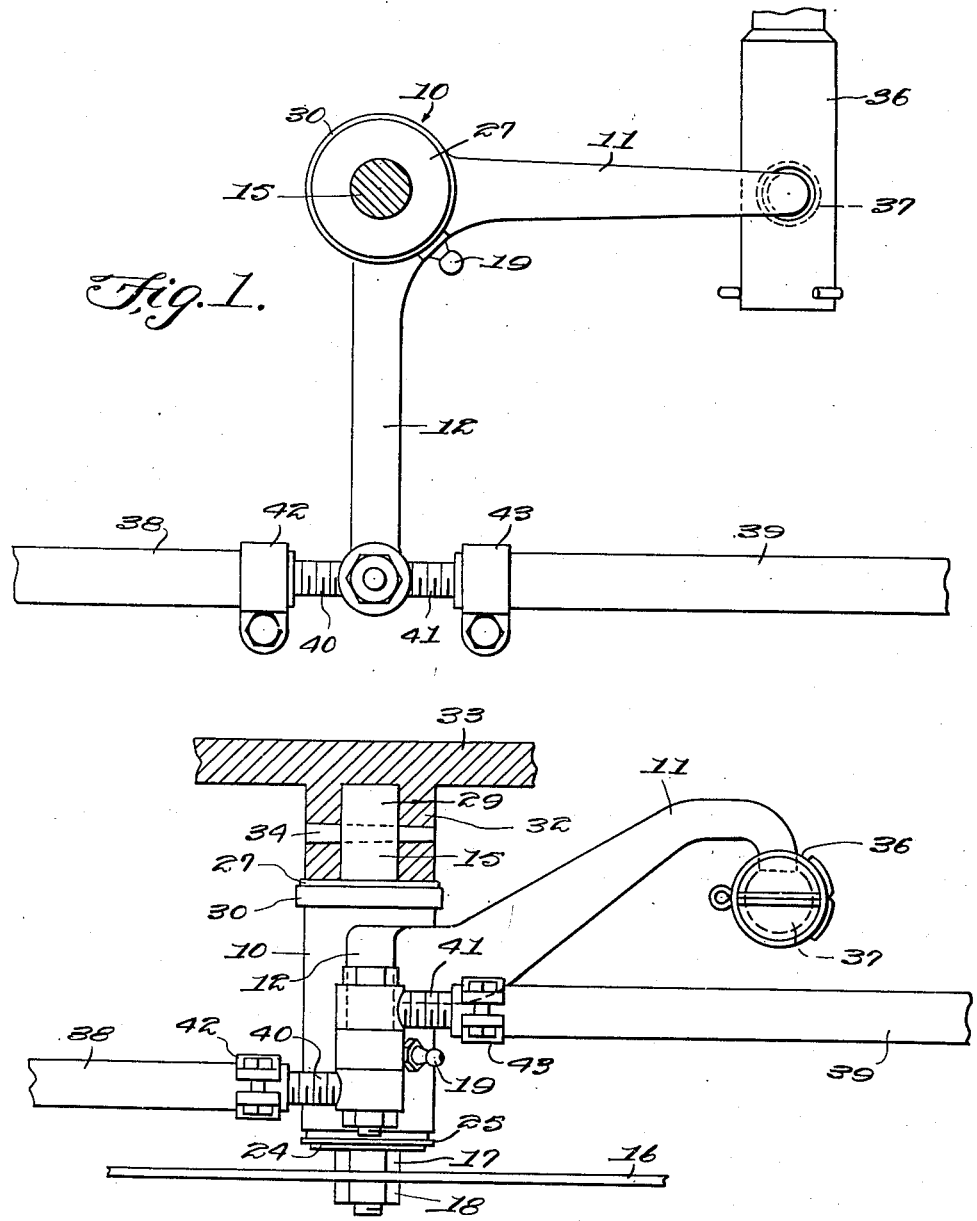

2,676,028

UNITED STATES PATENT OFFICE 2,676,028

ADJUSTABLE IDLER STEERING ARM BEARING

Keith W. Cook, Columbus, Mont.

Application June 6, 1950, Serial No. 166,470

1 Claim. (Cl. 280—95)

This invention relates to motor vehicle parts, and in particular an adjustable bearing assembly incorporated in the hub of the radius and tire rod arms of the steering assembly of a motor vehicle.

The purpose of this invention is to provide positive bearing elements for replacing the needle bearing type of mounting of steering arms of motor vehicles and wherein wear in the bearings may readily be taken up.

In the conventional type of steering arm mounting instrumentalities the radius and tie rod arms are pivotally mounted in needle type of bearings and wear developing in the bushings and other associated parts requires replacing bearing elements of the assembly and it is difficult in some localities to obtain the replacement parts. With this thought in mind this invention contemplates an improved idler bearing assembly including roller bearings mounted in the ends of a hub from which the radius and tie rod arms of the steering assembly extend, wherein means is provided for taking up wear in the bearings.

The object of this invention is, therefore, to provide an improved idler steering arm mounting in which play developing in the parts thereof is removed by adjusting the nut on the lower end of the bearing assembly.

Another object of the invention is to provide an improved idler bearing assembly for steering arms that may be installed on vehicles now in use.

A further object of the invention is to provide an improved adjustable bearing assembly for radius and tie rods of steering assemblies of motor vehicles which is of a simple and economical construction.

With these and other objects and advantages in view the invention embodies an elongated hub having radius rod and tie rod arms extended therefrom with the hub journaled on a mounting pin and with adjusting means for taking up wear in the elements.

Other features and advantages of the invention will appear from the following description taken in connection with the drawings wherein:

Figure 1 is a plan view illustrating the hub with the tie and radius rods extended therefrom and connected to respective parts of the vehicle.

Figure 2 is a side elevational view illustrating the pin extended upwardly from the upper end of the hub mounted in part of the frame of the vehicle.

Figure 3 is a similar view taken at a right angle to that shown in Figure 2.

Figure 4 is a vertical section on an enlarged scale showing the interior construction of the hub and bearing.

Figure 5 is a sectional plan taken on line 5—5 of Figure 4 showing a section through the hub.

Referring now to the drawings wherein like reference characters denote corresponding parts the improved idler steering arm bearing of this invention includes a hub 10 having a radius rod or steering arm 11 extended at one side with a tie rod arm 12 extended at a right angle thereto and the hub 10 is journaled in bearings 13 and 14 on a mounting pin 15, lower end of which is secured in a brace bar 16 by an adjusting nut 17 and a lock nut 18.

The hub 10, which is provided with a grease fitting 19, is provided with a recess 20 in the upper end in which the bearing 13 is positioned and a similar recess 21 in the lower end in which the bearing 14 is positioned.

A cup shaped grease sealing washer 22 with a spacing ring 23 therein is provided in the lower end of the hub and a spacing washer 24 with a grease seal washer 25 is provided on the outer end of the washer 22 with the adjusting nut 17 holding the spacing elements and lower bearing against a shoulder 26 on the lower end of the pin 15.

A similar spacing washer 27, which is positioned against a shoulder 28 at the lower end of the head 29 of the pin is positioned beyond the grease seal 30 that fits over the upper end of the hub, as shown in Figure 4. The pin 15 is provided with a shoulder 31 against which the bearing 13 is positioned.

The upper end 29 of the pin 15 is fixedly mounted in a hub or casing 32 extended downward from a frame 33 and the pin is secured in position by a pin 34 which extends through the hub and head 29 of the pin. The head 29 is provided with an opening 35 to receive the pin 34.

With the parts arranged in this manner the idler steering arm hub 10 is suspended from the frame 33 through the pin 15 and with the arm 11 pivotally attached to the radius rod 36 through the ball 37 on the end thereof and with the arm 12 connected to the sections 38 and 39 of the radius rod by adjusting screws 40 and 41 and clamps 42 and 43, respectively, the turning movement of a steering wheel is transmitted through the idler bearing and hub on the steering arm to the tie rod sections with a free movement and as wear develops in the parts the play resulting therefrom is taken up by adjusting the nuts 17 and 18.

It will be understood that modifications may be made in the design and arrangement of the parts without departing from the spirit of the invention.

What is claimed is:

An idler steering arm bearing assembly comprising a hollow cylindrical hub having a steering arm extending from one side thereof, a tie rod arm arranged at right angles with respect to said steering arm, said arms being formed integral with said hub, a mounting pin extending through said hub and including an upper head arranged exteriorly of said hub, an intermediate cylindrical portion positioned in said hub and being of less diameter than said head, a bottom portion of less diameter than said intermediate portion having a threaded lower end, there being a shoulder between said head and said intermediate portion, and a shoulder between said lower portion and intermediate portion, a brace bar provided with an opening receiving the threaded portion of said pin, an adjusting nut arranged in engagement with the threaded portion of said pin and positioned above said brace bar, a lock nut positioned below said brace bar and arranged in engagement with the threaded portion of said pin, a spacing washer arranged contiguous to the upper surface of said adjusting nut, a grease seal washer arranged contiguous to said spacing washer, a cup shaped sealing washer arranged contiguous to said last named washer and having a portion projecting into said hub, a spacing ring arranged inside of said cup shaped sealing washer and mounted on said pin, there being a bearing in each end of said hub, said hub being provided with annular recesses for receiving said bearings, a grease seal mounted on the upper end of said hub, a spacing washer arranged contiguous to the upper surface of said grease seal, a casing surrounding the head of said pin, there being registering openings in said casing and head, and a pin extending through said registering openings.

References Cited in the file of this patent

UNITED STATES PATENTS

| Number | Name | Date |
|---|---|---|
| 1,452,531 | Sherbondy | Apr. 24, 1923 |
| 1,594,148 | Buckwalter | July 27, 1926 |
| 1,686,170 | Opitz | Oct. 2, 1928 |
| 1,970,378 | Higbee | Aug. 14, 1934 |
| 2,134,721 | Kraekemier | Nov. 1, 1938 |